United States Patent [19]

Eto et al.

[11] Patent Number: 4,737,863

[45] Date of Patent: Apr. 12, 1988

[54] METHOD FOR DISTRIBUTING AND RECORDING VIDEO SIGNALS AND AN APPARATUS USING THE SAME

[75] Inventors: Yoshizumi Eto, Sagamihara; Masuo Umemoto, Tokyo; Sinich Miyazaki, Kodaira, all of Japan

[73] Assignees: Hitachi, Ltd; Hitachi Denshi Kabushiki Kaisha, both of Tokyo, Japan

[21] Appl. No.: 758,702

[22] Filed: Jul. 25, 1985

[30] Foreign Application Priority Data

Sep. 19, 1984 [JP] Japan ................................ 59-194721

[51] Int. Cl.⁴ .............................................. H04N 9/86
[52] U.S. Cl. .................................... 358/334; 358/314; 358/327
[58] Field of Search ............... 358/310, 314, 334, 327, 358/328; 360/32, 38.1, 24, 22

[56] References Cited

U.S. PATENT DOCUMENTS

| 4,277,807 | 7/1981 | Baldwin ............................. 358/314 |
| 4,329,708 | 5/1982 | Yamamoto et al. ................ 358/310 |
| 4,419,687 | 12/1983 | Dischert et al. ..................... 358/314 |
| 4,590,522 | 5/1986 | Takemoto et al. .................... 360/32 |
| 4,622,598 | 11/1986 | Doi et al. ............................... 360/22 |
| 4,638,380 | 1/1987 | Wilkinson et al. ..................... 360/22 |

Primary Examiner—Donald McElheny, Jr.
Attorney, Agent, or Firm—Antonelli, Terry & Wands

[57] ABSTRACT

Video signal components including the luminance and color signals are sampled using a clock generator and dividers, and the resultant signals are coded through a plurality of channels and are recorded in a video tape recorder. In order to suppress and disperse in the screen image the effect of an error or a dropout occurring in a channel during a recording/playback process, the coded pixels are distributed to each channel so as to uniformly disperse the pixels associated with each component in the screen image. For this purpose, the pixels on a line perpendicular to the scanning lines on the screen are extracted sequentially from a different channel; consequently, even if a failure takes place in a channel, the erroneous pixel can thus be compensated for by use of the correct pixel just above or below the erroneous pixel. The coded pixels are subjected to a bit reversion or complementing to be conducted on every second pixel, and the direct current component of the obtained signals is suppressed, then the resultant signals are recorded on a recording medium.

12 Claims, 4 Drawing Sheets

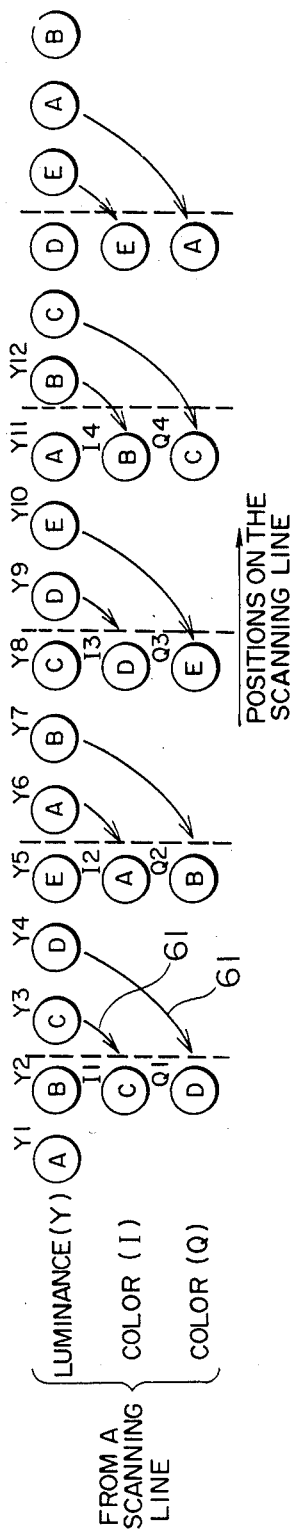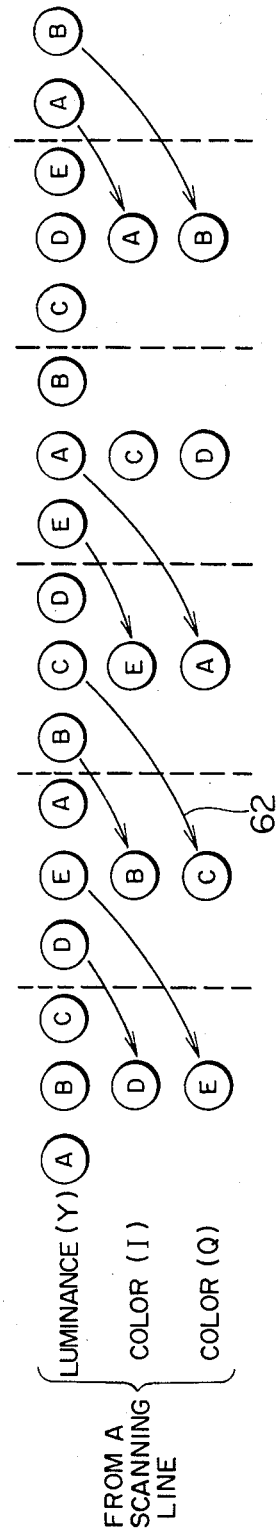

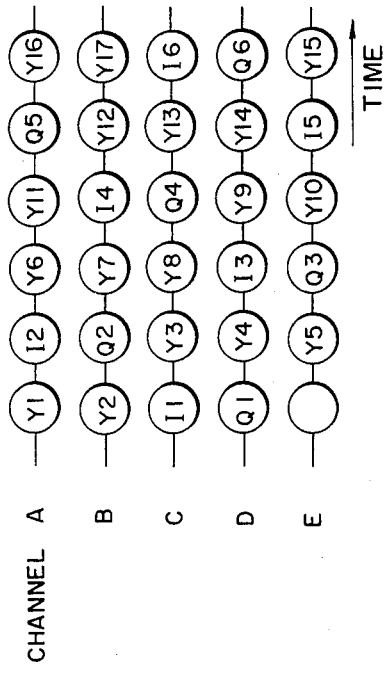
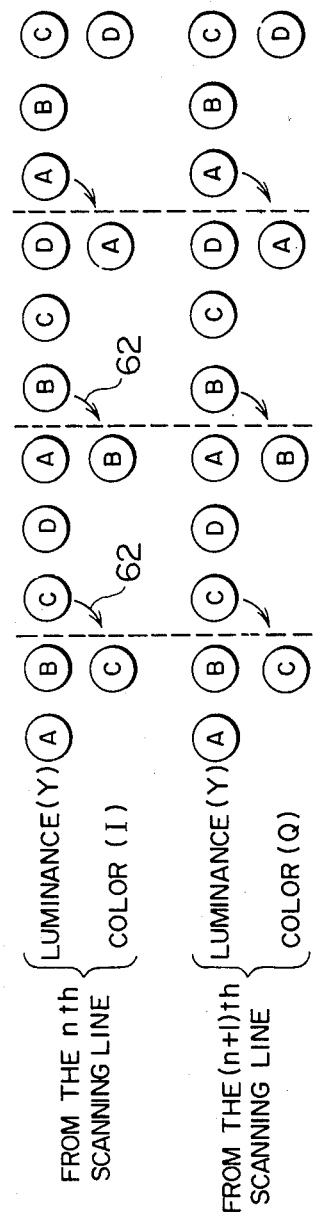

METHOD FOR DISTRIBUTING AND RECORDING VIDEO SIGNALS AND AN APPARATUS USING THE SAME

CROSS-REFERENCES TO RELATED APPLICATIONS

The present invention is related to the U.S. patent application Ser. Nos. 756,668 and U.S. Pat. No. 4,652,942 and 756,706, U.S. Pat. No. 4,698,811; entitled as METHOD AND SYSTEM FOR CONVERTING BINARY DATA and DIGITAL PICTURE RECORDING/REPRODUCING METHOD AND APPARATUS filed by Yoshizumi Eto and Yoshizumi Eto, Masuo Umemoto, Hidehiro Kanada and Seiicha Mita under claiming priorities based on the Japanese Patent Application Nos. 59-194719 and 59-194722, respectively and both assigned to the same assignee as that of the present application.

BACKGROUND OF THE INVENTION

Field of the Invention

The present invention relates to a method for distributing digital codes converted from video signals and recorded on a plurality of channels on a recording medium utilizing magnetism, lights, or the like.

A digital VTR is an example of an apparatus in which video signals are converted into digital codes to be recorded on a medium by use of magnetism, lights, or the like. Since the codes obtained from the video signals yield high-speed data having a transfer rate of at least 100 Mb/s, it is very difficult to record the codes with a magnetic head, for example. In order to overcome this difficulty, there has been employed a technique which allows the codes to be distributed to a plurality of channels so as to record the codes in a parallel fashion by using a plurality of magnetic heads at the same time.

The following three methods for distributing video codes have been well known as described in "A Study on Variable Speed Reproduction of the Digital VTR", Y, Hirano et al., SMPTE Journal, Vol. 92, No. 6 (June 1983), pp 636–641. For example, the video codes are distributed to channels A, B, and C as follows.

1. For each pixel, the high-order, intermediate, and low-order bits are distributed to channels A, B, and C, respectively.
2. For every three consecutive pixels, operations are repeated for the channels as A, B, C; A, B, C; and so on.
3. The pixels in the left-hand side area, the central area, and the right-hand side area of the screen are distributed to channels A, B, and C, respectively.

In the publication article described above, however, the channel distribution was mainly considered for signals (so-called composite signals) in which the luminance and color signals are multiplexed in accordance with a frequency division like the NTSC signal.

On the other hand, to record a high-quality picture, it has been believed that each component signal should be respectively recorded without multiplexing the luminance and color signals by use of the frequency division. Any examples have not been known yet in which the optimization of the channel distribution with respect to so called component signal system has been described.

SUMMARY OF THE INVENTION

It is therefore an object of the present invention to provide a method for encoding and distributing signals which allows a characteristic deterioration in a certain channel not to be clearly perceived on a display screen when the screen is displaying luminance and color signals that are separately converted into digital signals and recorded on a plurality of channels.

Another object of the present invention is to provide a relationship to a plurality of frequency dividers for respectively sampling video component signals so as to efficiently generate the clock signal for the frequency division.

Still another object of the present invention is to provide a method and an apparatus using the same in which the digitized video signal components recorded on a multichannel recording medium are corrected, when a channel failure occurs, by the data on the other channel, thereby minimizing the disturbance in the displayed picture.

Furthermore, another object of the present invention is to provide a method and an apparatus using the same in which encoded pixels of the luminence and color signals are respectively recorded on the different channels and that even when a channel failure as a result of the improvements herein takes place, such a failure is not clearly recognized in the displayed image.

Another object of the present invention is to suppress a direct current component in the converted codes to minimize the effect of the deteriorated low-frequency characteristic of the recording medium.

In accordance with the present invention, the optimum relationships are provided between the sampling frequencies and the number of channels for the luminance and color signals, respectively; furthermore, the pixel codes obtained by sampling the luminance and color (or chrominance) signals, respectively, are mixed and the resultant signals are substantially uniformly distributed to each channel. Next, the phase for the distribution of the signals is shifted at an interval of the scanning line so as to allow the effect of characteristic deterioration on a specific channel not be aligned in the perpendicular direction on the reproduced image. In addition, when a subsequent code conversion is performed to suppress the direct current component by use of the correlation of the image, the signal distribution is achieved on a set of specific pixels. According to the present invention, for the respective luminance and color signals, the signal recording operation is carried out by distributing the signals according to the interval associated with the number of channels.

BRIEF DESCRIPTION OF THE DRAWINGS

FIGS. 1a–1b are schematic diagrams illustrating arrays of pixels associated with component signals on a scanning line;

FIG. 3, consisting of A-E, is a diagram depicting signal distribution to each recording channel for the pixel array of FIG. 1a;

FIG. 4 illustrates an example of the distribution implemented by an intermediate process which may be utilized to attain the distribution of the present invention.

DESCRIPTION OF THE PREFERRED EMBODIMENTS

Figure 2:
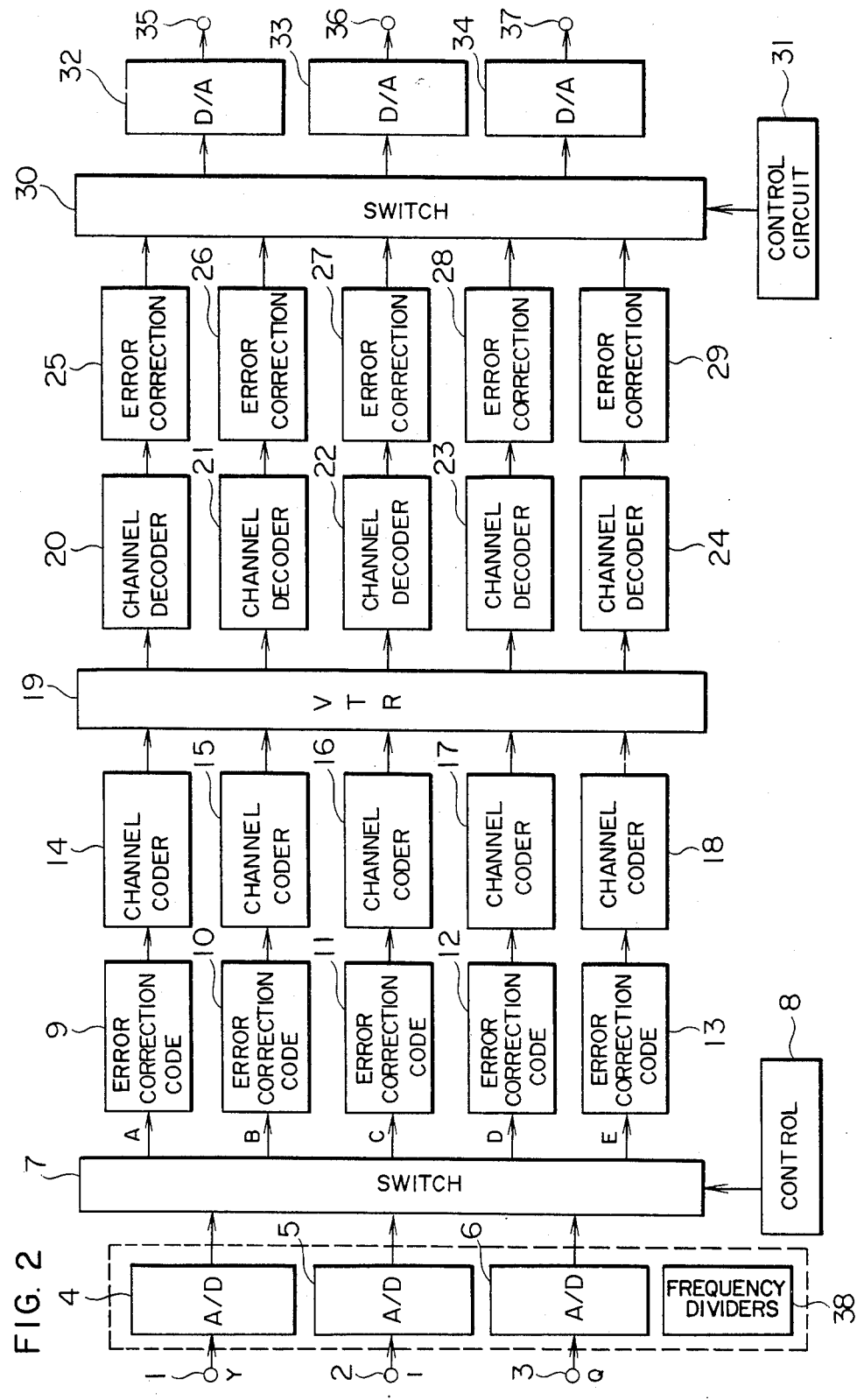
FIG. 2 is a schematic block diagram illustrating an embodiment of a digital video signal recording/playback apparatus.

When the luminance and color or chrominance signals are sampled respectively, the sampling frequency of the luminance signal is higher than that of the color signal in general because the frequency band of the luminance signal is wider than that of the color signal. To be exact, the frequency band varies between two color signals, for example, between the I and Q signals. For instance, provided that the band widths for the luminance, color or chrominance (I) and color or chrominance (Q) signals are 4.2, 1.5 and 0.5 MHz, respectively, it will be necessary to provide generators having signal frequencies of 2.0 to 2.5 as high as these band widths, respectively. For the simplification of the apparatus, the same sampling frequency is generally used for the I and Q signals. Also to simplify the apparatus, the sampling frequency of the luminance signal is selected to be an integer multiple of the sampling frequency of the color signal in many cases. The sampling frequencies of the luminance and color signals are assumed to be $f_y$ and $f_c$ and the ratio, $f_y/f_c$ to be N.

On the other hand, if a pixel comprises eight bits, for example, then the bit rates of the luminance and color signals are obtained as $8 f_y$ and $8 f_c$, respectively. When distributing these codes to channels which are M in number, the circuits required for each channel as the error correction coders and encoders can be advantageously shared by setting the same bit rate for the channels 1 to M. Assume the bit rate for each channel to be B, then the following equation holds with respect to the total the bit rate values assigned to the luminance signal and two color signals I and Q.

$$8f_y + 2 \times 8f_c = MB \quad (1)$$

Where, the signals on each scanning line includes the Y, I, and Q signals.

Since $f_y = Nf_c$, expression (1) is reduced to $$8(N+2)f_c = MB \quad (2a)$$

On the other hand, if the two color signals are recorded for every other scanning line, that is, in accordance with a so-called line sequential recording system in which the Y and I signals are recorded in association with odd-numbered scanning lines and the Y and Q signals are recorded in association with even-numbered scanning lines, the following expression is similarly satisfied.

$$8(N+1)f_c = MB \quad (2b)$$

For purposes of simplification, assume that a single channel develops a bit rate for recording a color signal. Since for a single channel $8f_c = B$, expressions (2a) and (2b) are respectively reduced to, $$M = N+2 \text{ (simultaneous recording system for the color signal)} \quad (3a)$$

$$M = N+1 \text{ (line sequential recording system for the color signal)} \quad (3b)$$

Assuming that the requirement for the simultaneous recording system is satisfied, that is, a channel has a bit rate for recording two color signals, then since $8f_c = B$, expressions (3a) and (3b) are respectively reduced to, $$M = \frac{N+2}{2} \text{ (stimultaneous recording system for color signal)} \quad (4a)$$

$$M = \frac{N+1}{2} \text{ (line sequential recording system for the color signal)} \quad (4b)$$

If the relationship of expression (2a) or (2b) is set for the number of channels M and the sampling frequency ratio N, the clock generation is greatly facilitated in the recording/playback apparatus. For example, in a case of expression (3a), an oscillator which oscillates at a frequency of $8f_y$ need only be utilized. Then, the sampling frequency $f_y$ of the luminance signal is obtained by dividing the signal from the oscillator by eight in the first divider, and the recording/playback frequency B for each channel results from a 1/N multiplication on the signal by use of the second divider; moreover, the sampling frequency $f_c$ of the color signal is attained by dividing B by eight in the third divider. That is, all necessary frequencies are obtained by using an oscillator and three dividers. If the number of channels is selected to be other than M as given by expression (3a), such a simple configuration cannot be realized. For example, if the number of channels is selected to be $M+1=N+3$ for the M of expression (3a), the value of B is determined by using expression (2a) as follows.

$$B = \frac{N+2}{N+3} \times 8f_c \quad (5)$$

For the frequency B, the frequency of $8f_y$ is divided by N to obtain $8f_c$, which then is divided by N+3 and the resultant value is multiplied by (N+2). In these processing, the multiplication by N+2 is quite difficult to be implemented.

As a consequence, for the distribution of the luminance and color signals to a plurality of channels, it is considerably effective to establish the relationship of expression (2a) and (2b) so as to implement a simple apparatus.

As the frequency bands of the luminance and color signals in the NTSC system, 4.2 MHz is selected for the luminance signal and 1.5 MHz and 0.5 MHz are used for the I and Q color signals. In this case, the value of N can be selected to be three, and the sampling of Q signal can be performed in the same rate as for the I signal. In a case where the color signals are recorded in the simultaneous recording system, M=5 is obtained from expression (3a).

In FIG. 1a, the positions of three pixels of the luminance signal and the position of each pixel of two color signals each is marked with a circle. When distributing these pixels to five recording channels A to E, they should be preferably distributed to the channels each marked with a circle because these five channels are uniformly distributed in each region separated by the vertical broken lines.

FIG. 2 illustrates an embodiment of a video signal distribution, recording, and playback circuit in accordance with the present invention.

An analog luminance (Y) signal and two color signals (I and Q) supplied to terminals 1, 2, and 3 are converted into digital codes in A/D converters 4, 5, and 6 using sampling signals supplied from a divider circuit 38, respectively, then the resultant signals are distributed through a switch 7 to the five channels A-E. The switch 7 is controlled according to the scanning line numbers and pixel positions supplied from a control circuit 8 so as to select a channel in accordance with the distribution method of the present invention. Error correction or detection coders 9-13 are utilized to add codes necessary for the error correction or detection. Modulators 14-18 each also includes the code conversion function for suppressing the direct current component as described before. A VTR 19 performs the recording and playback operations. Reference numberals 20-24 indicate demodulators. Error correction or detection decoders 25-29 each carries out the error correction and modification. A switch 30 is controlled by a control circuit 31 so as to operate in reverse order with respect to the switch 7, thereby restoring the signals distributed on the five channels again to the luminance signal and two color signals. D/A converters 32-34 output the analog luminance and color signals to terminals 35-37.

The same effect is obtained by placing the error correction encoders 9-13 and error correction decoder 25-29 between the switch 7 and A/D converters 4-6 and between the switch 30 and D/A converters 32-34, respectively.

The channel distribution of FIG. 1a brings forth the following advantageous features.

(1) For the luminance signal, five pixels are regularly distributed as A, B, C, D, E; A, B, C, D, E; and so on, whereas for the color signal I, they are distributed as C, A, D, B, E, C, A, D, B, E, and so forth, and for the color signal Q they are distributed as D, B, E, C, A, D, B, E, C, A, and so forth. That is, when a characteristic deterioration such as a dropout takes place on a specific channel, for example, channel A at recording or playback, the deterioration occurs in every fifth pixel along the scanning line for both luminance and color signals.

(2) If a mixture of the luminance and two color signals are separated, for example, as indicated by dotted lines in FIG. 1a so that each group contains five pixels, then all channels A to E each are found in the group separated by the dotted lines. That is, even if a characteristic deterioration occurs in a specific channel, the deterioration takes place only in one of the luminance and two color signals which are configured in five pixel units as described above, thereby preventing the deterioration from taking place in two or more signals at the same time.

In these cases (1) and (2), the characteristic deterioration at recording or playback is indicated to be dispersed in the reproduced screen image so as to advantageously conceal the characteristic deterioration on the screen. FIG. 1b illustrates another embodiment in which the separation dotted lines of FIG. 1a are shifted to the right by one pixel. An arrow 62 indicates that channel D to which a luminance pixel Y4 is distributed also records the color (I) pixel associated with a luminance pixel Y2 at channel B at a position ahead by two pixels and that channel E to which a luminance pixel Y5 is distributed also records the color (Q) pixel associated with luminance pixel Y2. FIG. 3 is a schematic diagram illustrating the order of the pixels distributed to the channels A-E from the pixel array on the scanning line shown in FIG. 1a. The subscript indicates the order of each of the pixels of the luminance (Y) and color (I, Q) signals shown in FIG. 1a. The advantageous features described in (1) and (2) will be further clearly understood by reference to FIG. 3.

For such advantageous features, the distribution need only be conducted in conformity with the following rules in general.

(a) The pixels of each luminance signal that is distributed to the channels, M in number (interval of M) according to the order on the scanning line as A, B, C, .. ., A, B, C, and so forth (the upper-most line of FIG. 1a).

(b) A mixture of the luminance and color signals are separated by every M (five) pixels, for example, as indicated by the dotted lines in FIG. 1a. The distribution destination of a luminance pixel at a fixed position in each group comprising M (five) pixels is set as the destination to which a color pixel selected from the subsequent M (five) pixels is to be distributed as indicated by an arrow. In the examlple of FIG. 1a, as depicted by the arrow, the distribution destination of the first luminance pixel (Y3) associated with the separation dotted line 61 is set as that of the color (I1) pixel of the preceding five pixels, and the distribution destination of the next luminance pixel (Y4) is set as that of the color Q1 pixel.

FIG. 4 is a diagram depicting a case in which the color signals are recorded in accordance with the line sequential recording system conforming to the distribution rules (a) and (b) described above.

Similarly, assume the frequency ratio to be represented as $N=3$, then $M=4$ results from expression (3b). In accordance with Rule (a), the pixels of the luminance signals are distributed for every four pixels as A, B, C, D; A, B, C, D and so forth and are mixed with the pixels of the color signals I and Q, and the resultant pixels are separated in four pixel units. As indicated by an arrow 62, the distribution destination of a luminance pixel immediately following the separation dotted line is set as that of the color signals of the preceding four pixels, namely, I on the nth scanning line and Q on the (n+1)th scanning line. This leads to the advantages (1) and (2) described before.

In some cases, on the other hand, like in a case of a dropout, a code error may occur in a signal of a specific channel for a long period of time. The error is impossible in this case even if a code error detection circuit is employed. Usually, the pixels are replaced on the same positions of the adjacent scanning lines in the same field or frame, that is, so-called correction is achieved. If an error occurs on the nth scanning line, the erroneous pixel is replaced with the pixel at the same position on the (n−1)th or (n+1)th scanning line.

FIG. 4 illustrates an example in which the pixels on two scanning lines are distributed to the respective channels, for example, the pixels just above or below those to be distributed to channel A are also distributed to channel A. If an error takes place on a specified channel for a long period of time in this situation, the wrong pixels form a vertical structure in the reproduced screen image. Even if the wrong pixel is replaced with the pixel just above or below the wrong pixel, the error correction cannot be appropriately carried out because the pixel which replaces the wrong pixel may also be wrong.

Figure 6:
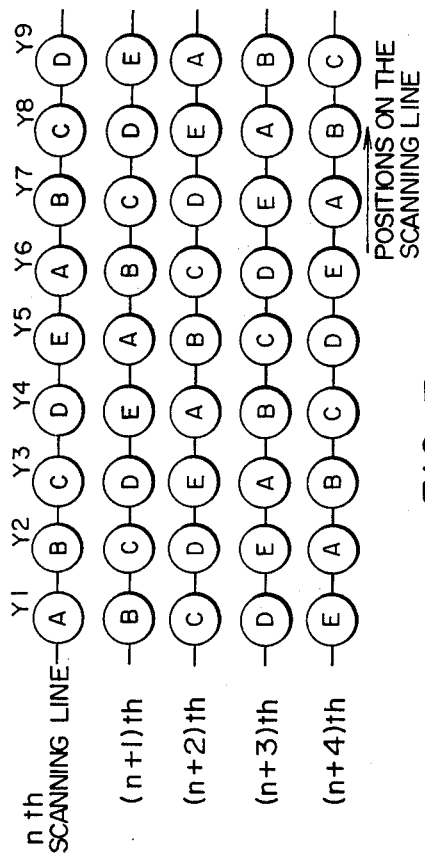
FIGS. 6–7 are diagrams showing the channel distribution of pixels on consecutive scanning lines.
Figure 5A:
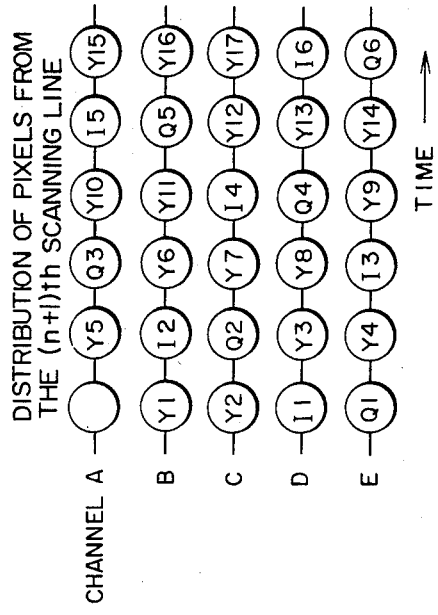
FIGS. 5a–5b depicts the distribution of pixels to the respective channels.
Figure 5B:
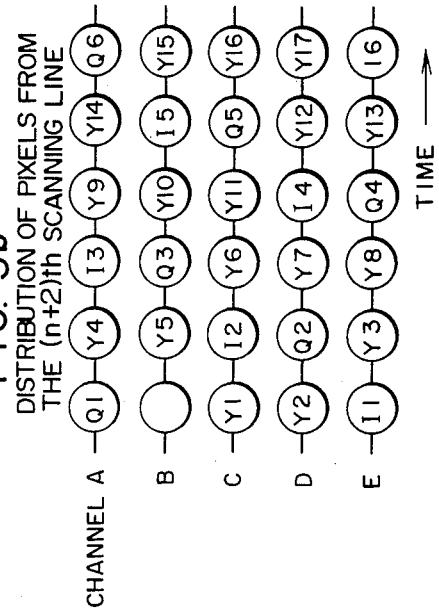

To remove this disadvantage, when the pixels of each of the channels are located in a form of an array shown in FIG. 3, the pixels on the (n+1)th and (n+2)th scanning lines should be arranged as illustrated in FIGS. 5a-5b. That is, for each scanning line, the pixels previously distributed to channel A, B, C, and so forth are distributed to channels B, C, D, and so forth, namely, the distribution channels are changed so as to allow the original distribution destination to appear again for every fifth scanning line. As depicted in FIG. 6, this prevents the same distribution destination from being successively located along the vertical direction for the pixels on each scanning line. Consequently, even if a signal error takes place in the signals of a specific channel, for example, channel A for a long period of time, the error correction can be appropriately performed by use of the pixel just above or below the wrong pixel. The pixels of color signals I and Q are distributed in the same fashion in both FIG. 1a and FIG. 6. Also in FIG. 6, it will be easily understood that the pixels of the I and Q signals corresponding to a luminance signal on a scanning line are recorded in the channels different from the channels in which the pixels of the I and Q signals associated with a luminance pixel of the next scanning line just above the luminance pixel are recorded.

Figure 7:
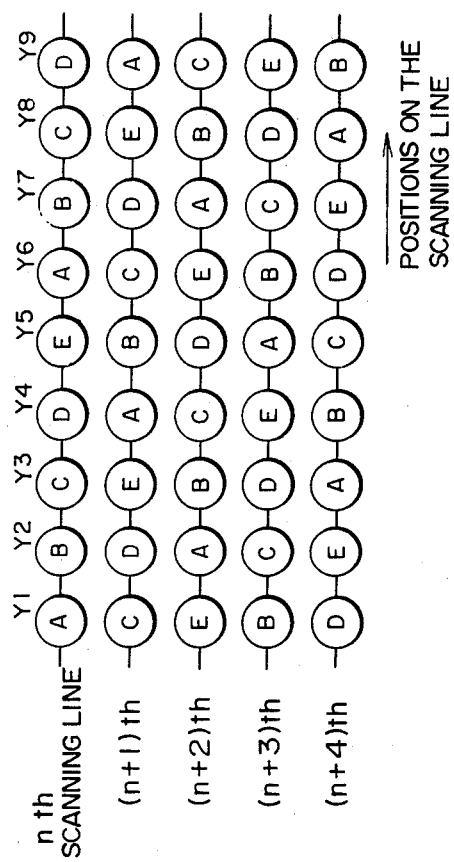

FIG. 7 is a schematic block diagram illustrating another embodiment which has also an excellent effect similar to that of FIG. 6. In this embodiment, the pixels previously distributed to channels A–E are distributed to channels C, D, E, A, and B, respectively, that is, the respective pixels are distributed to the every second channel. The embodiments of FIGS. 5a, 5b, 6 and 7 are applicable to both the line sequential and simultaneous recording systems.

An error correction or detection code is added to each signal thus distributed to the associated channel; moreover, the resultant codes are inputted to the converters 14-18 so as to be converted into codes suitable for the magnetic recording operation.

In general, the direct current component cannot be recorded or reproduced in a magnetic recording system, and hence the primary object of the code conversion is to suppress the direct current component detected in the code signals.

An example of the code conversion for suppressing the direct current component has been disclosed in the Japanese Patent Unexamined Publication No. 58-75950. In this case, the pixels having a strong correlation therebetween, for example, the pixels adjacent to each other on the same scanning line are recorded in a pair by reversing the polarity of the codes, which substantially cancels the direct current component of the codes in two pixel units. In this example, the pixel codes are arranged in the weight code order before the polarity is reversed so as to prevent the weight from varying between the adjacent pixels, thereby facilitating the suppression of the direct current component.

In the examples described above, the pixels are distributed to the different channels for each pixel; however, if the code conversion is executed at a subsequent step, the pixels should be preferably distributed in two pixel units. That is, the pixels Y1, Y2, I1, Q1, and so forth shown in FIG. 1a each need only be replaced with two pixels (an even number of pixels in general). Under this condition, if the polarity reversal or complementing is carried out for each pixel after the pixels are distributed to the respective channels, the suppression of the direct current component can be implemented for each channel.

It will be able to change the distribution patterns of the pixels for scanning lines shown in FIGS. 6 and 7 sequentially, instead of using a predetermined pattern for a display. Namely, the pattern shown in FIG. 6 is used for a field (or frame) and, for the next field (or frame), the distribution rule for the scanning line (n+1) may be applied to the next line (n+2), and the rule for the line (n+2) to the line (n+3) and so on. For the third field (or frame), the rule for the line (n+1) is applied to the line (n+3), similarly. Though this embodiment is not shown to avoid complexity of the drawings, the pattern shift of the distribution rule in both position and time will present a further improved quality of the image, since specified pixels corresponding to a recording channel are not always under correction even when the channel has more errors as compared with the other channels. Thus, the portions with errors by failure of a channel are not fixed in the display.

What is claimed is:

1. An apparatus for effecting a digital recording of video signal information in the form of luminance video-signal components and chrominance video-signal components on a recording medium via a plurality of recording channels for pixels arranged in scanning lines for a video display, comprising:
    (a) means for performing an analog-to-digital conversion to convert said luminance and chrominance video-signal components into a plurality of representative pixel codes each having a plurality of bits;
    (b) means for distributing luminance pixel codes on a scanning line to the recording channels so that every $M^{th}$ pixel code in either horizontal or vertical direction is distributed to the same channel, wherein M represents the number of recording channels;
    (c) means for distributing respective chrominance pixel codes, which corresponds to the same pixel to which respective luminance pixel codes are associated, to different recording channels from those luminance pixel codes consisting of the same pixel; and
    (d) means for recording said plurality of distributed pixel codes on said recording medium in parallel via said plurality of recording channels.

2. An apparatus for effecting a digital recording of a plurality of video-signal components according to claim 1, wherein said distributing means furthermore distributes said pixel codes, corresponding to said luminance and chrominance video-signal components of a next scanning line adjacent to a scanning line in said video display, to a recording channel different from a recording channel corresponding to a pixel code in said latter mentioned scanning line.

3. An apparatus for effecting a digital recording of a plurality of video signal components according to claim 1, wherein said distributing means distributing said pixel codes, corresponding to said luminance and chrominance video-signal components of a scanning line in said video display, to a recording channel different from the recording channels corresponding to the immediately above positioned pixels of a preceding scanning line by a number of scanning lines fewer than the number of said channels.

4. An apparatus for effecting a digital recording of a plurality of video signal components according to claim 1, further comprising means connected to an output of said distributing means for effecting bit complementing on a pixel code bit for every second pixel code of consecutive pixels on a scanning line to thereby suppress a direct current component of the pixel code, wherein said distributing means performs distribution of said pixel codes in units of two consecutive pixels on said scanning lines.

5. An apparatus for effecting a digital recording of a plurality of video-signal components according to claim 3, wherein said video-signal components are comprised of a first and second chrominance signals (I, Q) and a luminance signal (Y) and said analog-to-digital conversion means of said digital recording apparatus further comprises:
   (a) a first frequency divider for inputting a clock signal and for dividing said clock signal to generate a signal for sampling said luminance signal,
   (b) a second frequency divider for inputting said clock signal and for dividing said clock signal in accordance with a ratio N, corresponding to a positive integer, obtained by dividing a sampling frequency of said luminance signal by a sampling frequency of said first and second chrominance signals to thereby obtain a recording/playback signal common to each channel for said pixel codes, and
   (c) a third divider for inputting said common recording/playback signal and for dividing said common recording/playback signal to generate a sampling signal of said first and second chrominance signals.

6. A method for digitally recording luminance and chrominance video-signal components on a recording medium via a plurality of recording channels for pixels arranged in scanning lines for a video display, comprising the steps of:
   (a) performing an analog-to-digital conversion to convert said luminance and chrominance video-signal components into a plurality of representative pixel codes each having a plurality of bits, respectively;
   (b) distributing luminance pixel codes on a scanning line to the recording channels so that every $M^{th}$ luminance pixel code in either horizontal or vertical direction is distributed to the same channel, wherein M represents the number of recording channels;
   (c) distributing chrominance pixel codes, which correspond to the same pixel to which respective luminance pixel codes are associated, to different recording channels from those luminance pixel codes consisting of the same pixel; and
   (d) recording said plurality of distributed pixel codes on the recording medium in parallel via said plurality of recording channels.

7. A method for digitally recording luminance and chrominance video-signal components according to claim 6, wherein the step for distributing said pixel codes further comprises distributing said pixel codes, corresponding to said luminance and chrominance video-signal components of a next scanning line adjacent to a scanning line in said video display, to a recording channel different from a recording channel corresponding to a pixel code in said latter mentioned scanning line.

8. A method for digitally recording luminance and chrominance video-signal components according to claim 6, wherein the step for distributing said pixel codes comprises distributing said pixel codes, corresponding to said luminance and chrominance video-signal components of a scanning line in said video display, to a recording channel different from the recording channels corresponding to the immediately above positioned pixels of a preceding scanning line by a number of scanning lines fewer than the number of said channels.

9. A method for digitally recording luminance and chrominance video-signal components according to claim 6, further comprising the step of effecting bit complementing on a pixel code bit for every second pixel code of consecutive pixels on a scanning line to thereby suppress a direct current component of the pixel code, wherein the step for distributing said pixel codes includes the step of distributing said pixel codes in units of two consecutive pixels on said scanning line.

10. An apparatus for effecting a digital recording of video signal information in the form of luminance video-signal components and chrominance video-signal components on a recording medium via a plurality of recording channels for pixels arranged in scanning lines for a video display, comprising:
   (a) means for converting the luminance component and chrominance component of a picture into digital pixel code information;
   (b) means for distributing the luminance pixel code information on a scanning line to the recording channels so that every Mth pixel code information in either the horizontal or vertical direction in a picture is distributed to the same recording channel, wherein M represents the number of recording channels; and
   (c) means for distributing respective chrominance pixel code information to the recording channels that are different from the recording channel where the luminance pixel code information of the same pixel is distributed.

11. An apparatus for effecting a digital recording of video signal information according to claim 10 wherein each pixel code consists of a pair of adjacent pixels.

12. An apparatus for effecting a digital recording of video signal information in the form of luminance video-signal components and chrominance video-signal components on a recording medium via a plurality of recording channels for pixels arranged in scanning lines for a video display, comprising:
   (a) means for converting the luminance component and chrominance component of a picture into digital pixel code information;
   (b) means for distributing the luminance pixel code information on a scanning line to the recording channels which are greater than the number of types of pixel code information so that every Mth pixel code information in either the horizontal or vertical direction in a picture is distributed to the same recording channel, wherein M represents the number of recording channels; and
   (c) means for distributing respective chrominance pixel code information to the recording channels that are different from the recording channel where the luminance pixel code information of the same pixel is distributed.

* * * * *